US011349703B2

(12) United States Patent
Mercian et al.

(10) Patent No.: US 11,349,703 B2
(45) Date of Patent: May 31, 2022

(54) METHOD AND SYSTEM FOR ROOT CAUSE ANALYSIS OF NETWORK ISSUES (71) Applicant: Hewlett Packard Enterprise Development LP, Houston, TX (US)

(72) Inventors: Anu Mercian, Santa Clara, CA (US); Chinlin Chen, Santa Clara, CA (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 38 days.

(21) Appl. No.: 16/938,430

(22) Filed: Jul. 24, 2020

(65) Prior Publication Data
US 2022/0029876 A1 Jan. 27, 2022

(51) Int. Cl.
*H04L 41/0631* (2022.01)
*G06N 20/00* (2019.01)
(Continued)

(52) U.S. Cl.
CPC ......... *H04L 41/0631* (2013.01); *G06N 20/00* (2019.01); *H04L 41/0654* (2013.01);
(Continued)

(58) Field of Classification Search
CPC . H04L 41/0631; H04L 41/0654; H04L 43/12; H04L 45/12; H04L 49/25; G06N 20/00
(Continued)

(56) References Cited

U.S. PATENT DOCUMENTS 7,379,061 B2\* 5/2008 Castonguay ........ H04L 41/0631
345/419
7,992,040 B2\* 8/2011 Agarwal ............... G06F 11/079
714/26
(Continued)

FOREIGN PATENT DOCUMENTS

CN 110083472 A 8/2019
KR 20190038526 A 4/2019

OTHER PUBLICATIONS

Salaün, A. et al., "Space-time Pattern Extraction in Alarm Logs for Network Diagnosis," 2nd IFIP International Conference on Machine Learning for Networking, Dec. 2019, pp. 1-20.
(Continued)

*Primary Examiner* — David P Zarka
(74) *Attorney, Agent, or Firm* — Park, Vaughan, Fleming & Dowler LLP (57) ABSTRACT An event analysis system in a network is provided. During operation, the system can determine a set of monitoring elements in the network. A respective monitoring element can facilitate monitoring of events in the network. The system can then represent a respective monitoring element as a node of a graph. If the corresponding monitoring elements are related based on a relationship definition, the system can connect a node pair of the graph with an edge. The system can activate a set of nodes of the graph corresponding to an issue in the network based on notifications from one or more monitoring agents on one or more switches in the network. Subsequently, the system can
(Continued)

determine a root cause of the issue by traversing the set of activated nodes of the graph and determine a recovery action for mitigating the root cause.

18 Claims, 10 Drawing Sheets

(51) Int. Cl.
   *H04L 49/25* (2022.01)
   *H04L 45/12* (2022.01)
   *H04L 43/12* (2022.01)
   *H04L 41/0654* (2022.01)

(52) U.S. Cl.
   CPC .............. *H04L 43/12* (2013.01); *H04L 45/12* (2013.01); *H04L 49/25* (2013.01)

(58) Field of Classification Search
   USPC ........................................................ 709/224
   See application file for complete search history.

(56) References Cited

U.S. PATENT DOCUMENTS

| | | | |
|---|---|---|---|
| 8,006,230 B2 * | 8/2011 | Agarwal | G06F 11/008 717/120 |
| 8,761,029 B2 * | 6/2014 | Ge | G06F 11/079 370/242 |
| 8,930,964 B2 | 1/2015 | Balakrishnan | |
| 9,697,103 B2 * | 7/2017 | Wang | G06F 11/3466 |
| 9,772,898 B2 * | 9/2017 | Deshpande | H04L 41/065 |
| 10,108,440 B2 | 10/2018 | Davies | |
| 10,318,366 B2 * | 6/2019 | Qi | H04L 41/5009 |
| 10,606,718 B1 * | 3/2020 | Sandlerman | G06F 11/203 |
| 10,652,119 B2 * | 5/2020 | He | H04L 43/0823 |
| 10,938,661 B1 * | 3/2021 | Pignataro | H04L 41/5045 |
| 2009/0327195 A1 * | 12/2009 | Iscen | G06N 5/042 706/47 |
| 2017/0244620 A1 * | 8/2017 | Wu | H04L 63/1425 |
| 2017/0372212 A1 | 12/2017 | Zasadzinski et al. | |
| 2019/0227860 A1 * | 7/2019 | Gefen | G06F 16/9024 |
| 2020/0099709 A1 | 3/2020 | Vasseur et al. | |
| 2021/0152416 A1 * | 5/2021 | A | H04L 41/0654 |
| 2021/0243068 A1 * | 8/2021 | R | H04L 41/0893 |
| 2021/0311655 A1 * | 10/2021 | Benjamin | G06F 3/0614 |

OTHER PUBLICATIONS

Xie, J. et al., "A Survey of Machine Learning Techniques Applied to Software Defined Networking (SDN): Research Issues and Challenges," IEEE Communications Surveys & Tutorials, Aug. 23, 2018, vol. 21, No. 1, pp. 393-430.

* cited by examiner

METHOD AND SYSTEM FOR ROOT CAUSE ANALYSIS OF NETWORK ISSUES

BACKGROUND

Field

The present disclosure relates to communication networks. More specifically, the present disclosure relates to a method and system for facilitating a root-cause analysis of an issue in a network.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for bandwidth. As a result, equipment vendors race to build switches capable of performing various functions. However, the resultant complexity of the switch can increase the difficulty of detecting an error in the switch. Furthermore, a network may include a number of such complex switches. In addition, the network may include different types of switches. Each type of switch may have different hardware, capabilities, and functionalities. For example, the switch can include a number of components, such as ports, forwarding hardware, and memory devices for storing states. Furthermore, the switch can maintain various protocols and perform corresponding operations, such as routing protocol, spanning tree protocol, and network virtualization.

An administrator can configure an individual component or a protocol. With existing technologies, automation and computer intelligence can be used to support the configuration operations in a large and distributed network. To facilitate the automation, the switch can be equipped with a monitoring agent (MA). The MA can allow an administrator to monitor switch resources and provide a framework to alert the administrator based on various pre-defined rules. However, understanding the root cause of a network-wide issue based on individual events can be challenging. As a result, if an event (e.g., an anomaly or an error) occurs, the administrator may need to troubleshoot each switch in the network individually.

One embodiment of the present invention provides an event analysis system in a network. During operation, the system can determine a set of monitoring elements in the network. A respective monitoring element can facilitate monitoring of events in the network. The system can then represent a respective monitoring element as a node of a graph. If the corresponding monitoring elements are related based on a relationship definition, the system can connect a node pair of the graph with an edge. The system can receive notifications indicating an issue in the network from monitoring agents on one or more switches in the network. A respective monitoring agent can monitor one or more switch components based on one or more monitoring rules. The system can then activate a set of nodes of the graph corresponding to the issue. Subsequently, the system can determine a root cause of the issue by traversing the set of activated nodes of the graph and determine a recovery action for mitigating the root cause.

In a variation on this embodiment, the set of monitoring elements can include a respective monitoring rule in a respective switch in the network, one or more switch components being monitored by the monitoring rule, and a monitoring agent facilitating monitoring operation based on the monitoring rule. Furthermore, a respective monitoring rule can include a condition for triggering the monitoring rule.

In a variation on this embodiment, the set of activated nodes correspond to monitoring elements of a plurality of switches in the network.

In a variation on this embodiment, the system can determine whether the issue is a critical issue. If the issue is a non-critical issue, the system can execute the recovery action on a switch in the network. Under such circumstances, the switch may include one or more switch components represented in the set of activated nodes of the graph.

In a further variation, if the issue is a critical issue, the system can obtain a confirmation from a user prior to executing the recovery action.

In a variation on this embodiment, the relationship definition indicates whether a pair of monitoring elements are related to each other. The system can then determine the relationship definition for a respective node pair in the graph based on one or more of: (i) a machine learning technique, and (ii) a user feedback.

In a variation on this embodiment, the system can activate the set of nodes of the graph by determining a set of monitoring rules that have been triggered by the issue and determining the corresponding nodes. These corresponding nodes can include a respective node corresponding to the set of triggered monitoring rules, one or more switch components associated with the triggered monitoring rules, and one or more monitoring agents associated with the monitoring rules.

In a variation on this embodiment, the system can traverse the set of activated nodes of the graph by applying a shortest path algorithm to a respective sub-graph of the set of activated nodes and determining a set of critical nodes identified by the shortest path algorithm. A respective critical node can correspond to a switch component impacted by the issue.

In a further variation, the system can determine, in the set of critical nodes, a plurality of correlated nodes and overlay the plurality of correlated nodes in the graph In a further variation, the system can determine the root cause by identifying a cause that activates the overlaid nodes.

The embodiments described herein solve the problem of efficiently identifying the root cause of a network issue by (i) representing, in a graph, a respective monitoring agent, a set of corresponding monitoring rules, and the switch components that are monitored; and (ii) traversing the graph to determine the switch components that may cause the network issue. A switch component can be any component of a switch. By identifying the switch components related to a network issue, the root cause of the issue may automatically be detected. If the event is non-critical, a switch can execute a recovery action corresponding to the root cause.

With existing technologies, a respective switch can be equipped with one or more monitoring agents. Each monitoring agent can monitor a specific feature of the switch. For example, a monitoring agent can monitor the port status of a respective port of the switch, and another monitoring agent can monitor the incoming and outgoing packet transmission. A respective monitoring agent may identify an event associated with the corresponding feature of the switch. However, since the switch can have a large number of features and be deployed in a variety of scenarios, events reported by the monitoring agents of the switch can be diverse and large in number.

Resolving a network event (e.g., an issue arising from an anomalous event) may include identifying the event and quickly resolving the issue that caused the event to reduce the impact. An administrator manually identifying the resources and actions to resolve an event reported by the monitoring agents can be error-prone and time-consuming. In addition, multiple switches of the network may have different switch types. As a result, for the same network event, alerts from monitoring agents from different switches may not correlate. Therefore, manually resolving an issue based on alerts from different monitoring agents (e.g., based on different troubleshooting guides) may be time-intensive and error-prone.

To solve this problem, an event analysis system can assist the administrator in identifying the root cause of an event in a network (e.g., across a plurality of switches). By providing the root-cause analysis of the issues caused by the event, the system can facilitate quick recovery from the event, thereby reducing the impact. During operation, the system can pre-generate a root-cause (RC) graph. Each node of the graph can represent a monitoring element, which can be a monitoring agent, a rule for monitoring a switch component, and the switch component. The rule can specify a condition associated with the component that triggers the rule. A rule can be a logical rule that can be triggered if a threshold associated with the corresponding switch components is crossed. A rule can also be a transition rule that can be triggered if a change is detected associated with the corresponding switch components. For example, if the component is a port, the rule can be a data transmission rate from the port falling below a threshold.

In the RC graph, the system can connect a node pair using an edge if there is a relationship between the monitoring elements representing the nodes. A relationship may exist between a monitoring agent and a rule that uses the rule to monitor a switch component. A relationship can also exist between a rule and the switch component that is being monitored by the rule. The system can maintain a relationship definition that includes a respective relationship that can be defined for a respective switch in a network. A relationship can be determined based on an automated discovery process or instruction from a user. For the automated discovery process, the system can recognize network behavioral patterns from clusters of events using machine learning. In other words, the system can train the machine learning technique using network behavioral patterns. The machine learning technique can then automatically or semi-automatically (e.g., based on user feedback) generate the connections in the graph. The system can store the graph information that represents the graph (e.g., a graph matrix representing the vertices and edges of the graph) in a graph database, which can be a relational database designed to store information in a switch.

A monitoring agent can detect an issue in a switch if a monitoring rule is triggered. The switch can maintain an event database that can store the rules. The event database can also be a relational database. When an issue is detected based on the triggered rule(s), the system can enable or activate the corresponding nodes in the graph. For example, a monitoring agent that monitors packet transmission or port status can include a rule that can be triggered by the packet loss at a port. The system can activate the nodes corresponding to the monitor, the rule, and the ports being monitored based on the rule.

The system can traverse a respective activated sub-graph, which can include nodes representing related monitoring elements, using a graph traversal algorithm (e.g., using a shortest-path algorithm). Based on the traversal, the system can determine nodes that may correspond to the switch components causing the issue. For example, if a graph is a tree, the traversal can identify one or more leaf nodes associated with the issue. If multiple such sub-graphs indicate a possible cause, the system may overlay the sub-graphs with the smallest order to generate an overlaid graph. The system can then determine the overlaid nodes that correspond to the issue. In some embodiments, the system can pre-load a set of recovery actions in an action data structure (e.g., in an action database), each of which can solve a non-critical issue of a switch. A respective recovery action can be represented as a series of steps or operations that can be executed on the switch. Upon detecting the root cause, the system can determine a recovery action associated with the detected root cause and execute the recovery action to solve a non-critical issue represented by the root cause.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

Network Architecture

Figure 1:
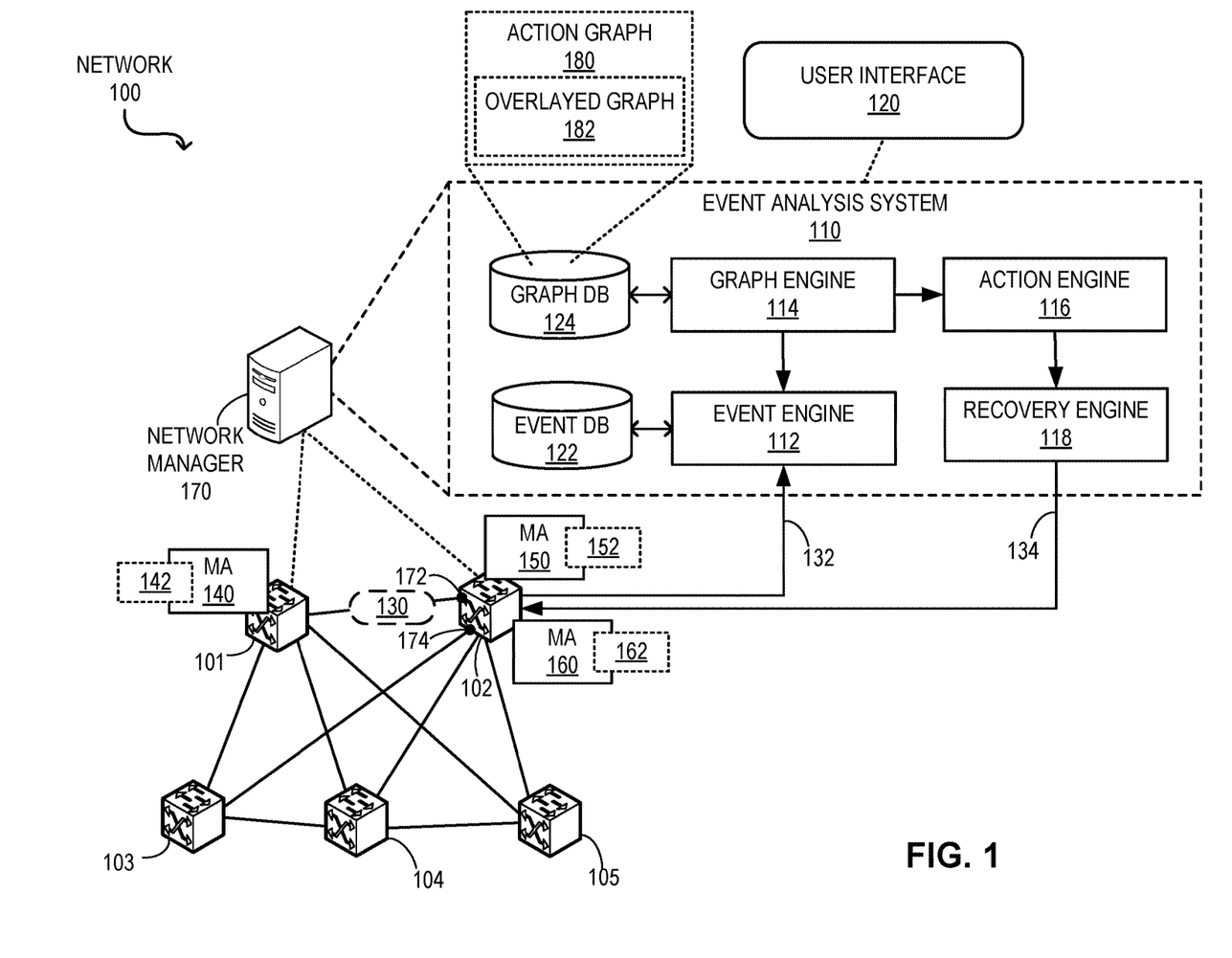
FIG. 1 illustrates an exemplary event analysis system that facilitates root-cause analysis in a network, in accordance with an embodiment of the present application.

FIG. 1 illustrates an exemplary event analysis system that facilitates root-cause analysis in a network, in accordance with an embodiment of the present application. As illustrated in FIG. 1, a network 100 includes switches 101, 102, 103, 104, and 105. In some embodiments, network 100 is a Gen-Z network, and a respective switch of network 100, such as switch 102, is a Gen-Z component. A Gen-Z network can be a memory-semantic fabric that can be used to communicate to the devices in a computing environment. By unifying the communication paths and simplifying software through simple memory-semantics, Gen-Z components can facilitate high-performance solutions for complex systems. Under such a scenario, communication among the switches in network 100 is based on memory-semantic fabric. In some further embodiments, network 100 is an Ethernet and/or IP network, and a respective switch of network 100, such as switch 102, is an Ethernet switch and/or IP router. Under such a scenario, communication among the switches in network 100 is based on Ethernet and/or IP.

With existing technologies, a respective switch can be equipped with one or more monitoring agents, each of which can monitor an individual feature of the switch. In network 100, monitoring agent 140 can monitor a feature of switch 101. Similarly, monitoring agents 150 and 160 can monitor corresponding features of switch 102. For example, monitoring agents 150 and 160 can monitor port status and packet transmission of ports 172 and 174 of switch 102. Similarly, monitoring agent 140 can monitor the port status of the ports of switch 101. Monitoring agent 150 may identify a network event 130 associated with the port status of switch 102 (e.g., a port has become unavailable). However, since switch 102 can have a large number of features and be deployed in a variety of scenarios in network 100 (e.g., as an aggregate, edge, or core switch), events reported by monitoring agents of switch 102 can be diverse and large in number.

Resolving network event 130 (e.g., an issue arising from an anomalous event in network 100) may include identifying event 130 and quickly resolving the issue that caused event 130 to reduce the impact on network 100. An administrator manually identifying the resources and actions to resolve event 130, based on the notifications from monitoring agents 140, 150, and 160, can be error-prone and time-consuming. In addition, multiple switches of network 100 may have different switch types. As a result, for the same event 130, alerts from monitoring agents from different switches may not correlate. Therefore, manually resolving event 130 based on alerts from different monitoring agents can be time-intensive and error-prone.

To solve this problem, an event analysis system 110 can assist the administrator in identifying the root cause of event 130. In some embodiments, system 110 can run on a network manager 170. Network manager 170 can be located in network 100 or can be deployed in the cloud (e.g., accessible via the Internet), and facilitate network configurations and management for a respective switch in network 100. By providing the root-cause analysis of the issues associated with event 130, system 110 can facilitate quick recovery from event 130. During operation, system 110 can include a graph engine 114 that can pre-generate an RC graph 180. RC graph 180 can include a respective monitoring element of network 100. Graph engine 114 can use graph 180 to determine the root cause of event 130. Graph engine 114 can present graph 180 on a user interface 120 of system 110.

Each node of graph 180 can represent a monitoring element, such as a monitoring agent, a rule for monitoring a switch component, and the switch component. A rule can be a logical rule that can be triggered if a threshold associated with the corresponding switch components is crossed. A rule can also be a transition rule that can be triggered if a change is detected associated with the corresponding switch components. For example, monitoring agents 140 and 150 can be configured with monitoring rules 142 and 152, respectively, to monitor the port status of switches 101 and 102, respectively. Here, rule 152 can indicate that monitoring agent 150 should monitor whether respective statuses of ports 172 and 174 have changed. Rule 152 can include a condition, which can specify that rule 152 should be triggered if the status of port 172 or 174 changes. Based on rule 152, monitoring agent 150 can then monitor for respective port statuses of ports 172 and 174. Similarly, monitoring agent 160 can be configured with monitoring rule 162 to monitor data transmission of switch 102. Here, rule 162 can indicate that monitoring agent 160 should monitor the volume or rate of data transfers via ports 172 and 174. Rule 162 can include a condition, which can specify that rule 162 should be triggered if the rate or volume of data transfers via port 172 or 174 falls below a threshold. Based on rule 152, monitoring agent 150 can then monitor for respective port statuses of ports 172 and 174.

In RC graph 180, graph engine 114 can connect a node pair using an edge if there is a relationship between the monitoring elements representing the nodes. A relationship can be determined based on an automated discovery process or instruction from a user. System 110 can store the graph information that represents graph 180 in a graph database 124. Graph database 124 can store the topology information regarding the graph. Also, graph database 124 may maintain a set of metadata for a respective node of graph 180. For example, if a node represents a monitoring agent, the metadata may include identifying information of that monitoring agent. On the other hand, if a node represents a port, the metadata may include the corresponding port number.

Graph 180 can include a sub-graph associated with a respective monitoring agent of a respective switch in network 100. Each of the sub-graphs can include the nodes representing the monitoring rules defined for the monitoring agent and the nodes representing the monitored switch components. As a result, nodes representing ports 172 and 174 may appear in the sub-graphs associated with monitoring agents 150 and 160. Similarly, monitoring agents monitoring based on the same rules on different switches can have different sub-graphs. Therefore, even though both monitoring agents 140 and 150 may monitor port status, each of monitoring agents 140 and 150 can have a sub-graph in graph 180.

Monitoring agent 150 can detect an issue in switch 102 if monitoring rule 152 is triggered. System 110 can maintain an event database 122 that can store rule 152 (and rules 142 and 162). When an issue is detected based on triggered rule 152, an event engine 112 of system 110 can receive a trigger notification 132 (e.g., a network message) from switch 102. Graph engine 114 can then enable or activate the corresponding nodes in graph 180. For example, if monitoring agent 150 monitors the port status of ports 172 and 174, rule 152 can be triggered by the packet loss at port 172 or 174. Graph engine 114 can activate the nodes corresponding to monitor 150, rule 152, and ports 172 and 174.

Graph engine 114 can traverse a respective activated sub-graph in graph 180 using a graph traversal algorithm and determine nodes that may correspond to the switch components that cause event 130. For example, if a graph is a tree, the traversal can identify one or more leaf nodes associated with event 130. If multiple such sub-graphs indicate a possible cause, graph engine 114 can evaluate each of the sub-graphs to determine the root cause. To further expedite the root-cause evaluation process, graph engine 114 may overlay the sub-graphs with the smallest order to generate an overlaid graph 182. Graph engine 114 can then determine the nodes in overlaid graph 182 that correspond to event 130. Graph engine 114 can then determine the root cause based on the determined nodes. In some embodiments, system 110 can pre-load a set of recovery actions (e.g., in an action database), each of which can solve a non-critical issue.

An action engine 116 of system 110 can then obtain a recovery action 134 corresponding to the root cause. Action engine 116 can determine a series of steps or operations that can be specified by recovery action 134 and executable on switch 102. Event database 122 can maintain a list of critical and non-critical events. A recovery engine 118 can lookup event 130 in event database 122 and determine whether event 130 is a critical event. If event 130 is a critical event, recovery engine 118 can execute the operations of recovery action 134 on switch 102 to resolve event 130. However, if event 130 is a critical event, recovery engine 118 may present event 130 and recovery action 134 in user interface 120. An administrator may verify whether recovery action 134 is an appropriate recovery action. Upon receiving a validation or approval, recovery action 134 may execute the operations of recovery action 134 on switch 102.

Figure 2A:
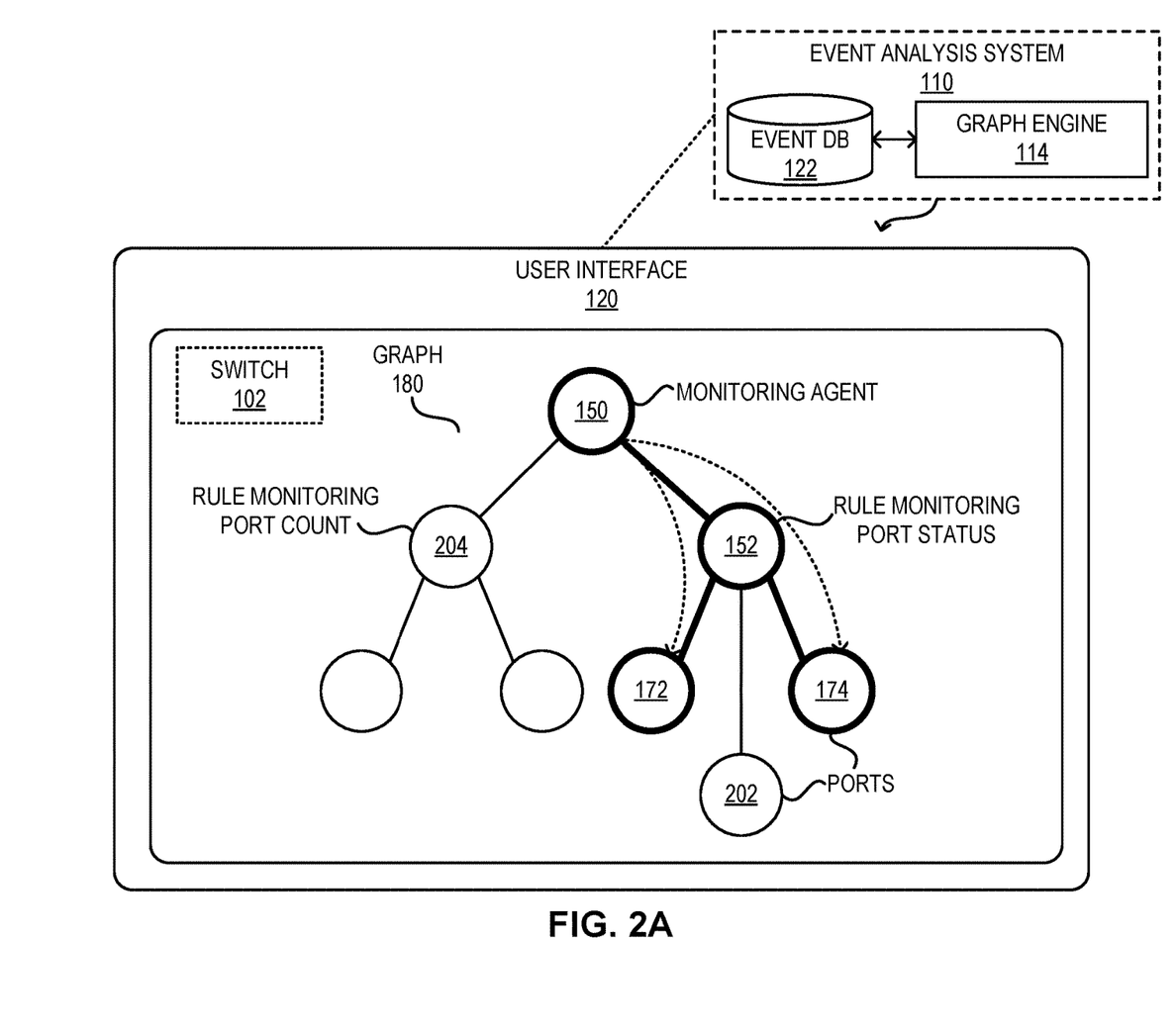
FIG. 2A illustrates an exemplary root cause (RC) graph, in accordance with an embodiment of the present application.

FIG. 2A illustrates an exemplary RC graph, in accordance with an embodiment of the present application. Graph 180 can include nodes corresponding to monitoring agent 150, rule 152, and ports 172 and 174. In this example, rule 152 can monitor the port status of the ports of switch 102. Graph 180 can also include a node for another port 202 of switch 102. However, port 202 can be inactive (e.g., disabled by a spanning tree protocol). Monitoring agent 150 can be configured with another rule 204, which can facilitate monitoring of the port count of the ports of switch 102. Graph engine 114 can connect a node pair using an edge if there is a relationship between the monitoring elements representing the nodes. Since monitoring agent 150 is configured with rules 152 and 204, the node representing monitoring agent 150 can be connected to nodes representing rules 152 and 204 via respective edges. Similarly, since rule 152 monitors the port status of the ports of switch 102, the node representing rule 152 can be connected to nodes representing ports 172, 174, and 202 via respective edges.

System 110 can maintain a relationship definition that includes a respective relationship that can be defined for switch 102. A relationship can be determined based on an automated discovery process or instruction from a user. For the automated discovery process, Graph engine 114 can recognize network behavioral patterns from clusters of events using machine learning, which can automatically or semi-automatically generate the connections in graph 180. If rule 152 is triggered by monitoring agent 150 due to a port status change, graph engine 114 may activate the nodes corresponding to monitoring agent 150, rule 152, and ports 172 and 174 (denoted with thick lines) and the edges coupling the nodes. However, since port 202 can be inactive, the node representing port 202 may not be activated. On the other hand, since the port count of switch 102 has not changed, rule 204 may not be triggered. Therefore, the sub-graph induced from the node representing rule 204 may not be activated even though the node representing monitoring agent 150 is activated.

Graph engine 114 can then traverse the activated sub-graph induced from the node representing monitoring agent 150 using a graph traversal algorithm. Examples of a graph traversal algorithm can include, but are not limited to, a shortest-path algorithm and a depth-first search algorithm, which can produce a shortest path in a tree. If graph 180 is a tree, the traversal algorithm may determine a leaf node representing a switch component, such as a port (denoted with dashed lines). In this way, graph engine 114 may use graph traversal to determine one or more critical nodes corresponding to the switch components that are affected by an event. If an event impacts a port status, by traversing the activated sub-graph, graph engine 114 can identify that ports 172 and 174 may have been affected by the event based on the critical nodes identified in graph 180.

Figure 2B:
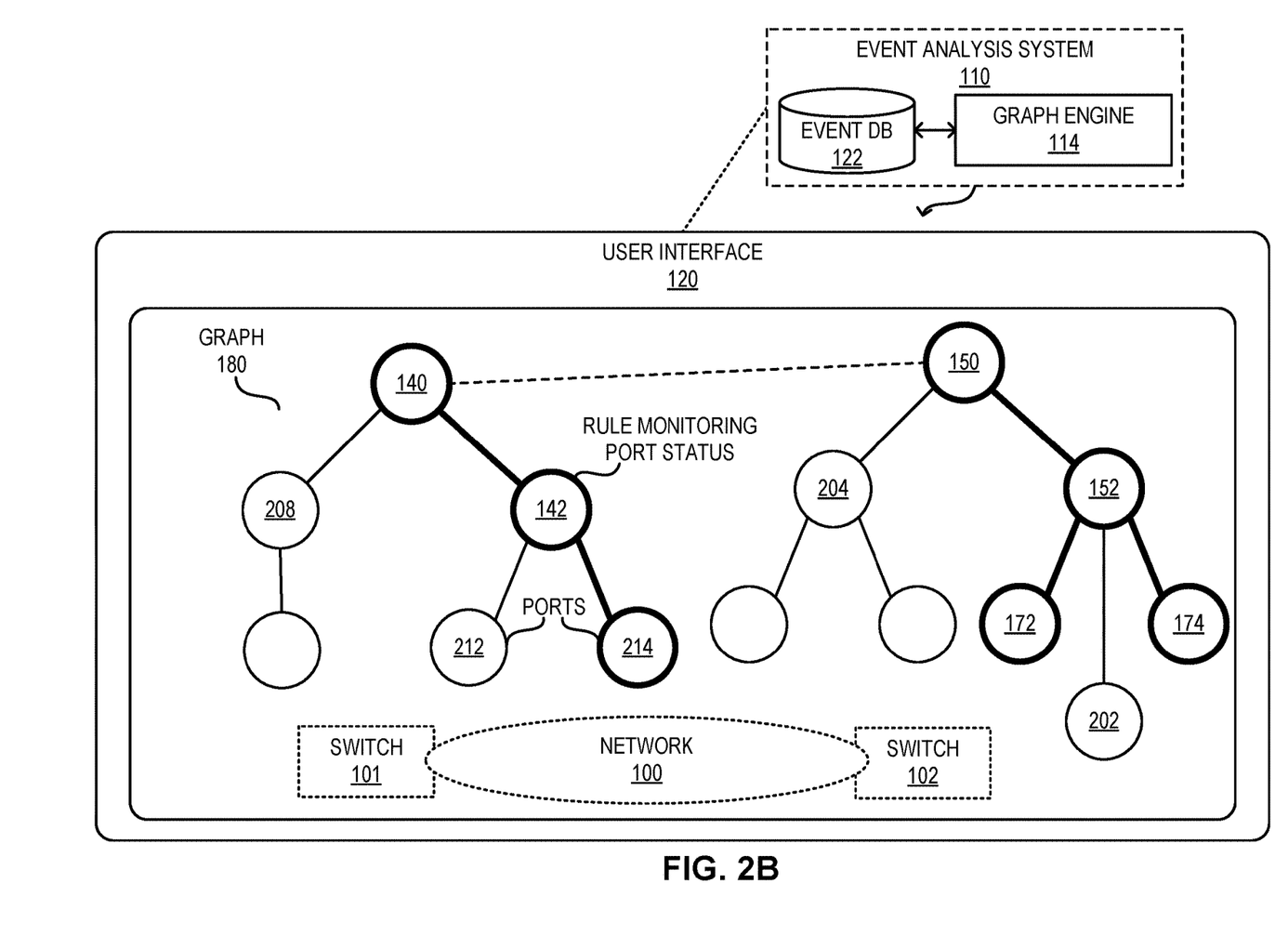
FIG. 2B illustrates exemplary network-wide RC graphs, in accordance with an embodiment of the present application.

Graph engine 114 can repeat the graph generation process, which is described in conjunction with FIG. 2A, to generate a sub-graphs induced from a node representing a respective monitoring agent of a respective switch of network 100. FIG. 2B illustrates exemplary network-wide RC graphs, in accordance with an embodiment of the present application. In addition to nodes of sub-graphs induced from nodes representing monitoring agents of switch 102, graph 180 can also include sub-graphs induced from nodes representing monitoring agents of other switches of network 100, such as switch 101.

Graph 180 can include nodes corresponding to monitoring agent 140 of switch 101, rule 142, and ports 212 and 214. In this example, rule 142 can monitor the port status of the ports of switch 101. Monitoring agent 140 can be configured with another rule 208, which can facilitate monitoring of the port count of the ports of switch 101. Graph engine 114 can connect a node pair using an edge if there is a relationship between the monitoring elements representing the nodes. Since monitoring agent 140 is configured with rules 142 and 208, the node representing monitoring agent 140 can be connected to nodes representing rules 142 and 208 via respective edges. Similarly, since rule 142 monitors the port status of the ports of switch 101, the node representing rule 142 can be connected to nodes representing ports 212 and 214 via respective edges.

Suppose that port 214 of switch 101 is coupled to a port of switch 102. Consequently, the port status change of a port of switch 102 can also cause a port status change in switch 101. Therefore, rule 142 can also be triggered by monitoring agent 140 due to a port status change. Consequently, graph engine 114 may activate the nodes corresponding to monitoring agent 140, rule 142, and port 214 (denoted with thick lines) and the edges coupling the nodes. Since rule 204 is not triggered, the sub-graph induced from the node representing rule 204 may not be activated even though the node representing monitoring agent 150 is activated. It should be noted that since monitoring agents 140 and 150 may not have a relationship, graph engine 114 may not connect the corresponding nodes in graph 180. As a result, graph 180 can be a disjointed graph. In some embodiments, graph engine 114 may couple the nodes corresponding to monitoring agents 140 and 150 with a virtual edge to indicate that these monitoring agents are in the same network 100.

Figure 3:
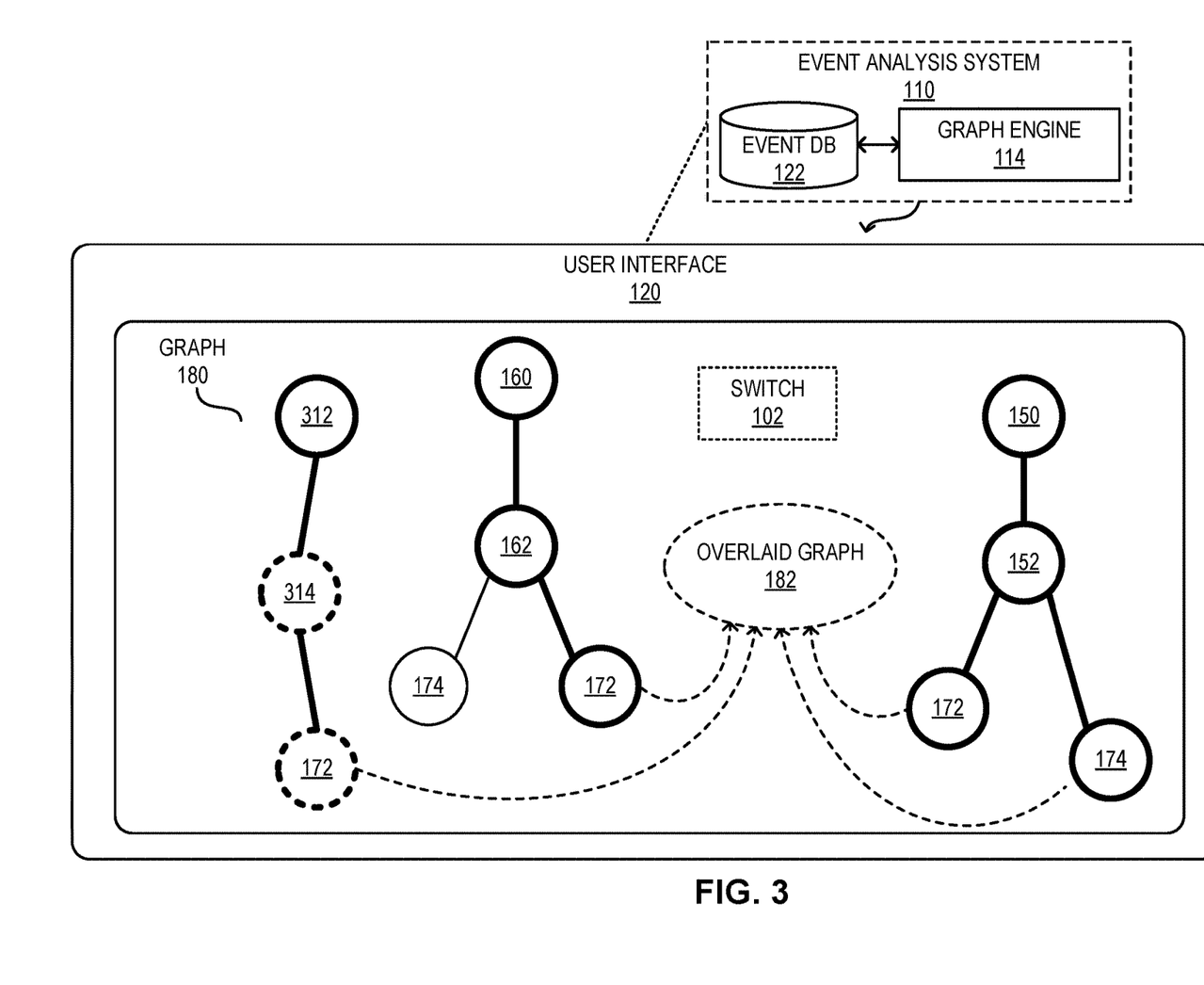
FIG. 3 illustrates an exemplary overlaying process of RC graphs representing different monitoring agents of a switch, in accordance with an embodiment of the present application.

Graph engine 114 can also repeat the graph generation process, as described in conjunction with FIG. 2A, to generate a sub-graph induced from a node representing a respective monitoring agent of a switch. Since multiple monitoring agents may monitor the same switch components, nodes representing such switch components may appear in multiple sub-graphs. To determine the root cause involving such switch components, graph engine 114 may overlap the corresponding nodes. FIG. 3 illustrates an exemplary overlaying process of RC graphs representing different monitoring agents of a switch, in accordance with an embodiment of the present application.

Graph 180 can also include nodes corresponding to monitoring agent 160 of switch 102, rule 162, and ports 172 and 174. In this example, rule 142 can monitor the port count of the ports of switch 102. Switch 102 can also include another monitoring agent 312, which can be configured with a rule 314. In this example, rule 314 can facilitate monitoring of the configuration of switch 102. However, a configuration change due to port unavailability may not be a critical event. Therefore, graph engine 114 may present the sub-graph induced by the node representing monitoring agent 312 as a "non-critical" sub-graph (denoted with dashed lines). Suppose that an event impacts a port of switch 102, such as port 172. As a result, rule 152 can be triggered by monitoring agent 150 due to a port status change, rule 162 can be triggered by monitoring agent 160 due to a change is transmission rate, and rule 314 can be triggered by monitoring agent 312 due to a configuration change.

Since each of the sub-graphs induced from monitoring agents 150, 160, and 312 can include a node representing port 172, each of the nodes can be activated by graph engine 114 (denoted with thick lines). Furthermore, graph engine 114 may also activate a node representing port 174 in the sub-graph induced by monitoring agent 150 because rule 152 can facilitate monitoring of the port status of a respective port of switch 102. Graph engine 114 can then traverse the activated sub-graphs of graph 180. Based on the graph traversal, graph engine 114 may identify a set of nodes in the sub-graphs (e.g., the leaf nodes corresponding to the ports of switch 102) as critical nodes.

Since multiple nodes on different sub-graphs can be identified as critical nodes, graph engine 114 can determine whether the critical nodes correlate (e.g., correspond to the same switch component). For example, graph engine 114 can determine that a set of correlated critical nodes represent the same port 172 of switch 102. Graph engine 114 can then overlay the nodes to generate overlaid graph 182. Since the critical nodes identified by graph engine 114 can include nodes corresponding to ports 172 and 174, overlaid graph 182 may also include nodes corresponding to ports 172 and 174. The node representing port 172 can be generated by overlaying all activated nodes that may represent port 172. It should be noted that since nodes corresponding to ports 172 and 174 may not have an edge between them, overlaid graph 182 can be a disjoint graph. In some embodiments, graph engine 114 may include a virtual node in overlaid graph 182 to connect the nodes and generate a continuous graph. By analyzing overlaid graph 182, graph engine 114 can determine that the root cause of an event is related to port 172 of switch 102.

Operations

Figure 4A:
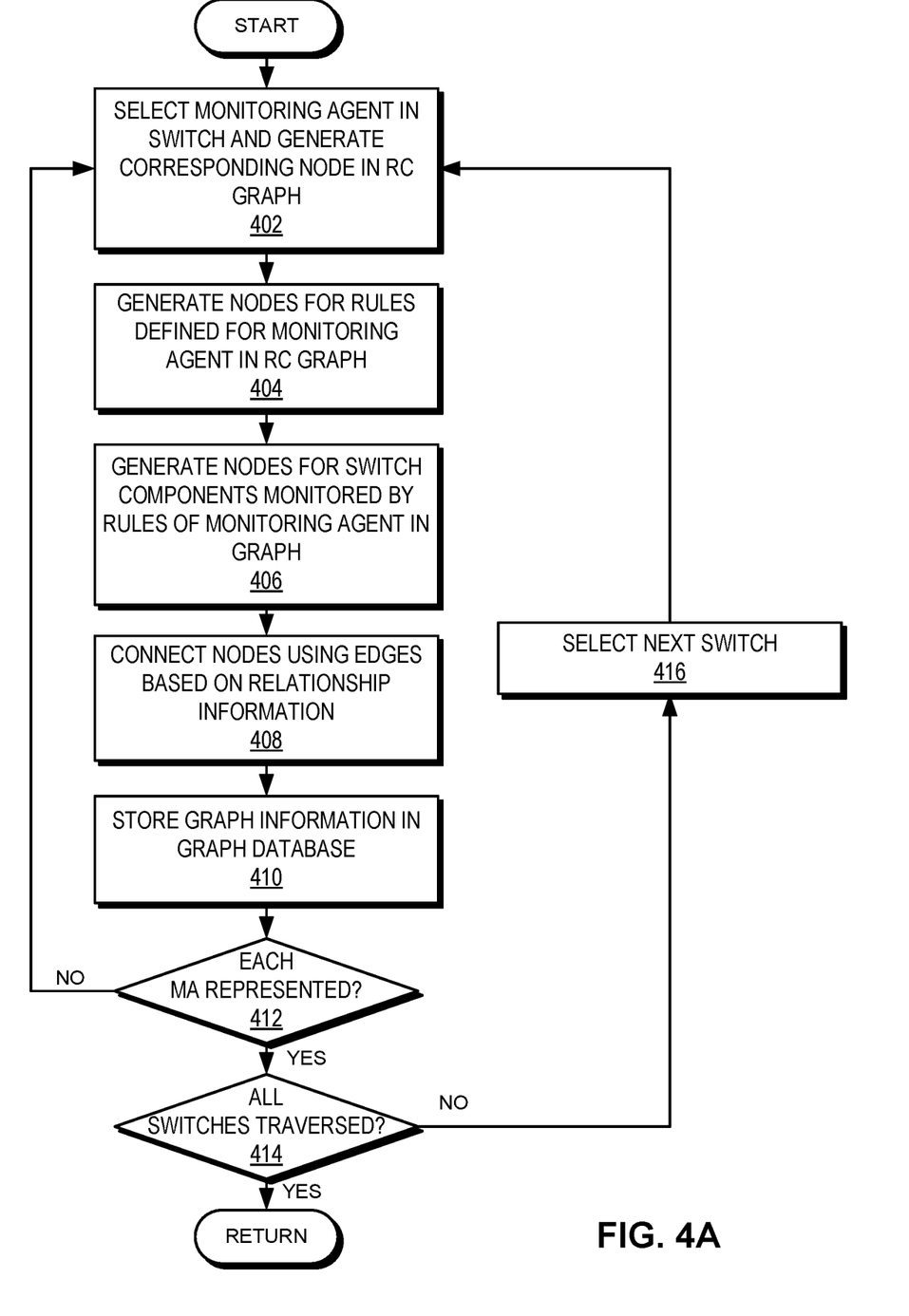
FIG. 4A presents a flowchart illustrating the process of an event analysis system generating an RC graph, in accordance with an embodiment of the present application.

FIG. 4A presents a flowchart illustrating the process of an event analysis system generating an RC graph, in accordance with an embodiment of the present application. During operation, the system can select a monitoring agent in a switch and generate a corresponding node in the RC graph (operation 402). The system can then generate nodes for rules defined for monitoring agent (operation 404) and nodes for switch components monitored by the rules of the monitoring agent in the RC graph (operation 406). The system can connect the nodes using edges based on the relationship information associated with the nodes (operation 408). In this way, a sub-graph induced from the monitoring agent is generated in the RC graph.

Subsequently, the system stores the graph information, which includes information representing the nodes and edges of the sub-graph, in a graph database (operation 410). The system can then check whether each monitoring agent has been represented in the RC graph (operation 412). If each monitoring agent has been represented, the system can check whether all switches have been traversed (operation 414). If all switches have not been traversed, the system can select the next switch (operation 414). If each monitoring agent has not been represented (operation 414) or upon selecting the next switch (operation 416), the system can select the next monitoring agent and continue to generate a corresponding node in the RC graph (operation 402).

Figure 4B:
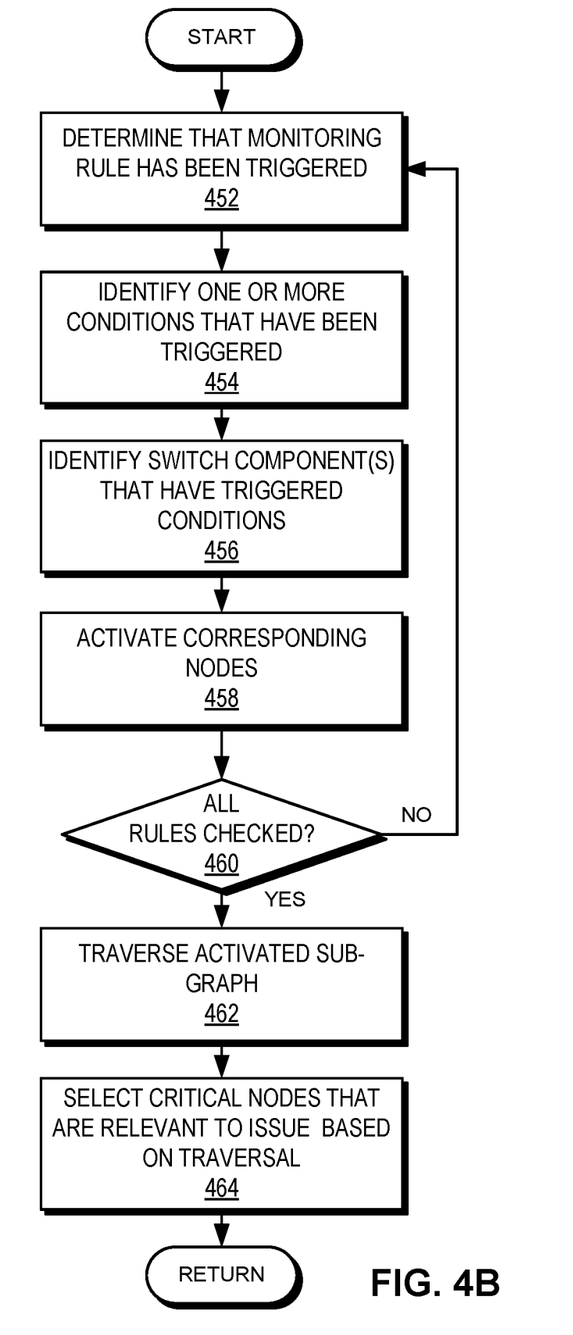
FIG. 4B presents a flowchart illustrating the overlaying process of RC graphs representing different monitoring agents of a switch, in accordance with an embodiment of the present application.

FIG. 4B presents a flowchart illustrating the overlaying process of RC graphs representing different monitoring agents of a switch, in accordance with an embodiment of the present application. During operation, the system can determine that a monitoring rule has been triggered (operation 452). The system can then identify one or more conditions that have been triggered (operation 454) and identify the switch component(s) that have triggered the conditions (operation 456). The system can then activate the corresponding nodes (operation 458). The corresponding nodes can include nodes representing a monitoring agent configured with the monitoring rule, the monitoring rule, and the switch component(s).

The system can then check whether all monitoring rules associated with the monitoring agent have been checked (operation 460). If all monitoring rules have not been checked, the system can continue to determine the next triggered monitoring rule (operation 452). On the other hand, if all monitoring rules have been checked, the system can traverse the activated sub-graph (operation 462). The system can then select the critical nodes that are relevant to the issue based on the traversal (operation 464). In the example in FIG. 3, the critical nodes can be the nodes representing ports 172 and 174.

Figure 5A:
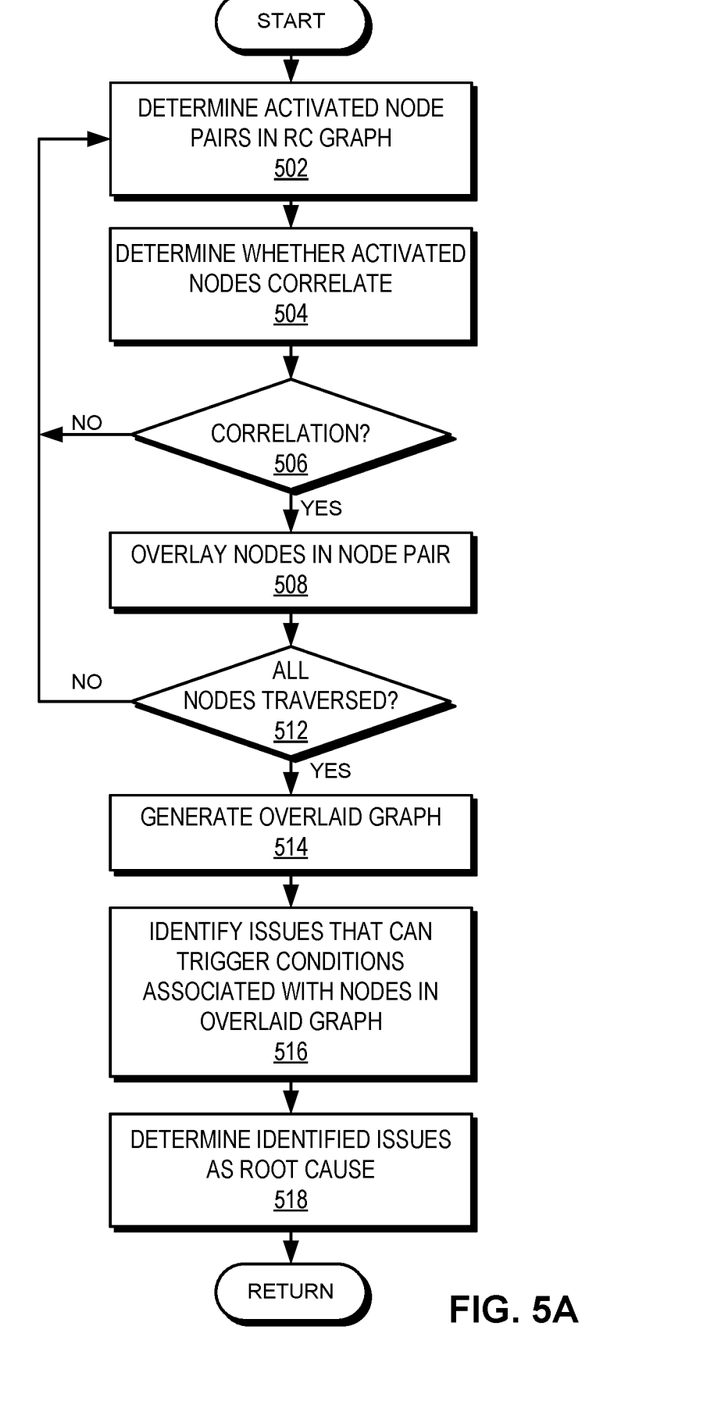
FIG. 5A presents a flowchart illustrating the process of an event analysis system performing a root-cause analysis using an RC graph, in accordance with an embodiment of the present application.

FIG. 5A presents a flowchart illustrating the process of an event analysis system performing a root-cause analysis using an RC graph, in accordance with an embodiment of the present application. The system can determine activated node pairs in RC graph (operation 502) and determine whether the activated nodes correlate (operation 504). The system can then determine whether a correlation has been determined (operation 506). Upon determining the correlation, the system can overlay the nodes in the node pair (operation 508) and determine whether all nodes have been traversed (operation 512).

If no correlation is determined (operation 506) or all nodes have not been traversed (operation 512), the system can continue to determine activated node pairs in RC graph (operation 502). On the other hand, if all nodes have been traversed, the system can generate an overlaid graph comprising the overlaid nodes (operation 514). The system can then identify issues that can trigger the conditions associated with the nodes in the overlaid graph (operation 516). Subsequently, the system can determine the identified issues as a root cause (operation 518).

Figure 5B:
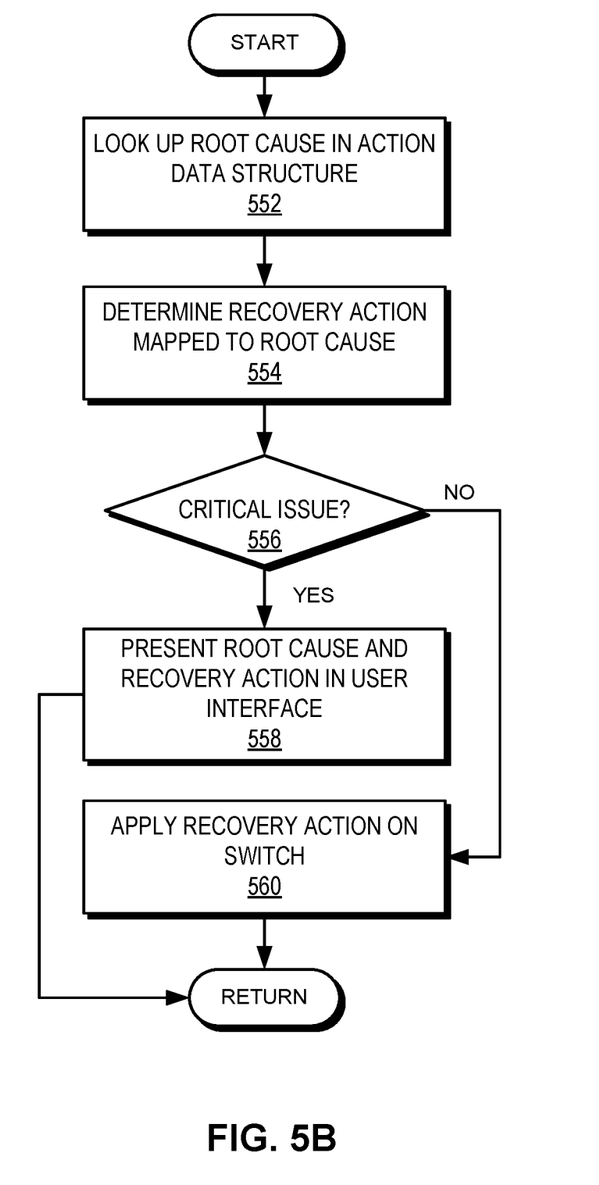
FIG. 5B presents a flowchart illustrating the process of an event analysis system applying a recovery operation based on root-cause analysis, in accordance with an embodiment of the present application.

FIG. 5B presents a flowchart illustrating the process of an event analysis system applying a recovery operation based on a root-cause analysis, in accordance with an embodiment of the present application. During operation, the system can look up the root cause in an action data structure (operation 552) and determine a recovery action mapped to the root cause (operation 554). The system can determine whether the issue is a critical issue (operation 556). If the issue is a critical issue, the system can present the root cause and the recovery action in a user interface of the system (operation 558). On the other hand, if the issue is a non-critical issue, the system can apply the recovery action on the switch (operation 560).

Exemplary Computer System

Figure 6:
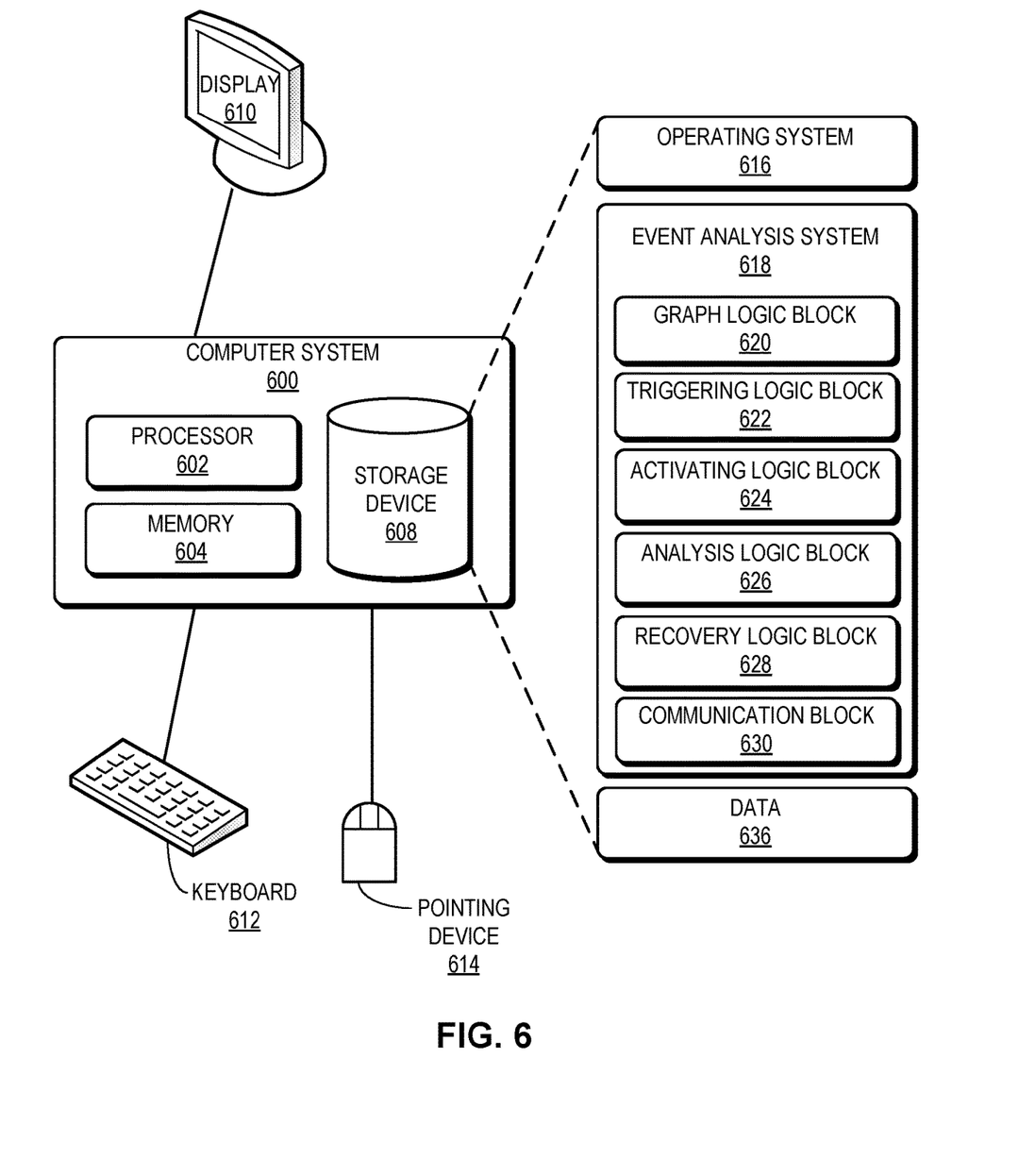
FIG. 6 illustrates an exemplary computer system that facilitates an event analysis system, in accordance with an embodiment of the present application.

FIG. 6 illustrates an exemplary computer system that facilitates an event analysis system, in accordance with an embodiment of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, an event analysis system 618, and data 636. Event analysis system 618 can facilitate the operations of system 110.

Event analysis system 618 can include instructions, which when executed by computer and communication system 600 can cause computer and communication system 600 to perform methods and/or processes described in this disclosure. Specifically, event analysis system 618 can include instructions for representing, for a respective switch in a network, a respective monitoring agent, a respective monitoring rule configured for the monitoring agent, and a respective switch components monitored based on the monitoring rule as a node in an RC graph (graph logic block 620). Furthermore, event analysis system 618 can include instructions for presenting the RC graph on a user interface, which can be presented by event analysis system 618 on display device 610 (graph logic block 620).

Event analysis system 618 can also include instructions for determining whether a monitoring rule has been triggered on a monitoring agent of a switch and identifying a corresponding event (and related issues) that has triggered the monitoring rule (triggering logic block 622). Moreover, event analysis system 618 can include instructions for activating relevant nodes in the RC graph, thereby generating one or more activated sub-graphs in the RC graph (activating logic block 624). Furthermore, event analysis system 618 can include instructions for determining critical nodes in a respective activated sub-graph based on graph traversal (analysis logic block 626). Event analysis system 618 can then include instructions for identifying a set of correlated critical nodes and overlaying the correlated critical nodes (graph logic block 620).

Event analysis system 618 can include instructions for determining a root cause of an issue causing the event (analysis logic block 626). Furthermore, event analysis system 618 may include instructions for identifying a recovery action and execute the recovery action on a switch to mitigate the impact of the event if the underlying issue is a non-critical issue (recovery logic block 628). Event analysis system 618 may further include instructions for sending and receiving messages (communication logic block 630). Data 636 can include any data that can facilitate the operations of event analysis system 618. Data 636 can include, but are not limited to, information related to a respective monitoring agent and a respective monitoring rule configured for the monitoring agent in a network, an event database, a graph database, and a recovery data structure.

Figure 7:
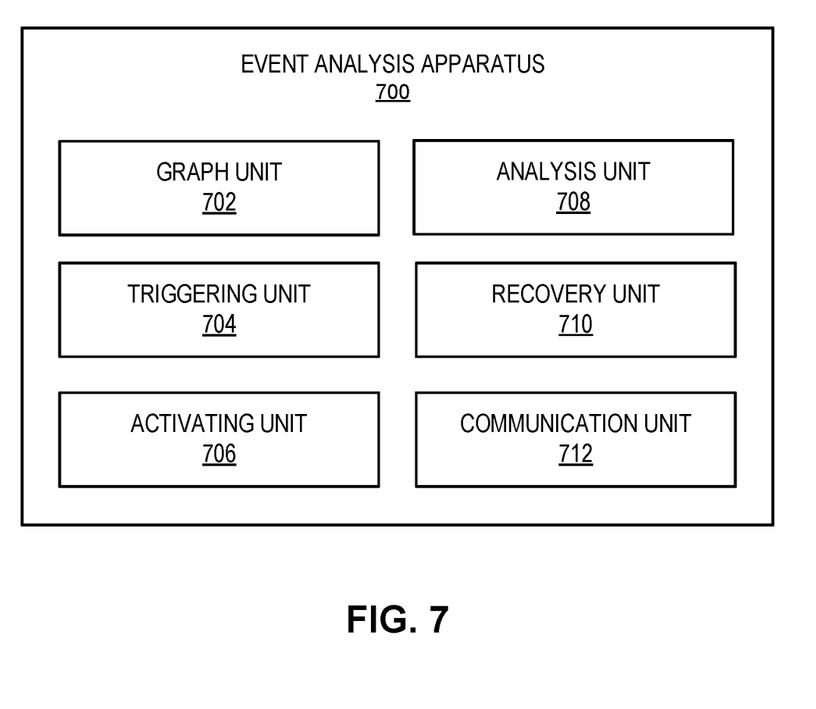
FIG. 7 illustrates an exemplary apparatus that facilitates an event analysis system, in accordance with an embodiment of the present application.

FIG. 7 illustrates an exemplary apparatus that facilitates an event analysis system, in accordance with an embodiment of the present application. Event analysis apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to modules 620-630 of computer and communication system 600 of FIG. 6, including: a graph unit 702; a triggering unit 704; an activating unit 706; an analysis unit 708; a recovery unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating root cause analysis in a network, comprising:
    determining a set of two or more monitoring elements in the network, wherein a respective monitoring element facilitates monitoring of events in the network;
    representing a respective monitoring element as a node of a graph, wherein a node pair of the graph is connected with an edge if the corresponding monitoring elements of the node pair are related based on a relationship definition;
    receiving, from monitoring agents on one or more switches in the network, notifications indicating an issue in the network, wherein a respective monitoring agent monitors one or more switch components based on one or more monitoring rules;
    activating a set of nodes of the graph corresponding to the issue;
    determining a root cause of the issue by traversing the set of activated nodes of the graph;
    determining a recovery action for mitigating the root cause;
    determining whether the issue is a critical issue; and
    in response to the issue being a non-critical issue, executing the recovery action on a switch in the network, wherein the switch includes one or more switch components represented in the set of activated nodes of the graph.

2. The method of claim 1, wherein the set of monitoring elements includes a respective monitoring rule in a respective switch in the network, one or more switch components being monitored by the respective monitoring rule, and a monitoring agent facilitating monitoring operation based on the respective monitoring rule; and wherein the respective monitoring rule includes a condition for triggering the respective monitoring rule.

3. The method of claim 1, wherein the set of activated nodes correspond to monitoring elements of a plurality of switches in the network.

4. The method of claim 1, further comprising, in response to the issue being a critical issue, obtaining a confirmation from a user prior to executing the recovery action.

5. The method of claim 1, wherein the relationship definition indicates whether a pair of monitoring elements are related to each other, and wherein the method further comprises determining the relationship definition for a respective node pair in the graph based on one or more of:
    a machine learning technique; and
    a user feedback.

6. The method of claim 1, wherein activating the set of nodes of the graph comprises:
    determining a set of monitoring rules that have been triggered by the issue; and
    determining a respective node corresponding to the set of triggered monitoring rules, one or more switch components associated with the triggered monitoring rules, and one or more monitoring agents associated with the monitoring rules.

7. The method of claim 1, wherein traversing the set of activated nodes of the graph comprises:
    applying a shortest path algorithm to a respective sub-graph of the set of activated nodes; and
    determining a set of critical nodes identified by the shortest path algorithm, wherein a respective critical node corresponds to a switch component impacted by the issue.

8. The method of claim 7, further comprising:
    determining, in the set of critical nodes, a plurality of correlated nodes; and
    overlaying the plurality of correlated nodes in the graph.

9. The method of claim 8, wherein determining the root cause further comprises identifying a cause that activates the overlaid nodes.

10. A non-transitory computer-readable storage medium storing instructions that when executed by a computer cause the computer to perform a method for facilitating root cause analysis in a network, the method comprising:
    determining a set of two or more monitoring elements in the network, wherein a respective monitoring element facilitates monitoring of events in the network;
    representing a respective monitoring element as a node of a graph, wherein a node pair of the graph is connected with an edge if the corresponding monitoring elements of the node pair are related based on a relationship definition;
    receiving, from monitoring agents on one or more switches in the network, notifications indicating an issue in the network, wherein a respective monitoring agent monitors one or more switch components based on one or more monitoring rules;
    activating a set of nodes of the graph corresponding to the issue;
    determining a root cause of the issue by traversing the set of activated nodes of the graph;
    determining a recovery action for mitigating the root cause;
    determining whether the issue is a critical issue; and
    in response to the issue being a non-critical issue, executing the recovery action on a switch in the network, wherein the switch includes one or more switch components represented in the set of activated nodes of the graph.

11. The computer-readable storage medium of claim 10, wherein the set of monitoring elements includes a respective monitoring rule in a respective switch in the network, one or more switch components being monitored by the respective monitoring rule, and a monitoring agent facilitating monitoring operation based on the respective monitoring rule; and wherein the respective monitoring rule includes a condition for triggering the respective monitoring rule.

12. The computer-readable storage medium of claim 10, wherein the set of activated nodes correspond to monitoring elements of a plurality of switches in the network.

13. The computer-readable storage medium of claim 10, wherein the method further comprises, in response to the issue being a critical issue, obtaining a confirmation from a user prior to executing the recovery action.

14. The computer-readable storage medium of claim 10, wherein the relationship definition indicates whether a pair of monitoring elements are related to each other, and wherein the method further comprises determining the relationship definition for a respective node pair in the graph based on one or more of:
    a machine learning technique; and
    a user feedback.

15. The computer-readable storage medium of claim 10, wherein activating the set of nodes of the graph comprises:
    determining a set of monitoring rules that have been triggered by the issue; and determining a respective node corresponding to the set of triggered monitoring rules, one or more switch components associated with the triggered monitoring rules, and one or more monitoring agents associated with the monitoring rules.

16. The computer-readable storage medium of claim 10, wherein traversing the set of activated nodes of the graph comprises:
   applying a shortest path algorithm to a respective subgraph of the set of activated nodes; and
   determining a set of critical nodes identified by the shortest path algorithm, wherein a respective critical node corresponds to a switch component impacted by the issue.

17. The computer-readable storage medium of claim 16, wherein the method further comprises:
   determining, in the set of critical nodes, a plurality of correlated nodes; and
   overlaying the plurality of correlated nodes in the graph.

18. The computer-readable storage medium of claim 17, wherein determining the root cause further comprises identifying a cause that activates the overlaid nodes.

* * * * *